UNITED STATES PATENT OFFICE.

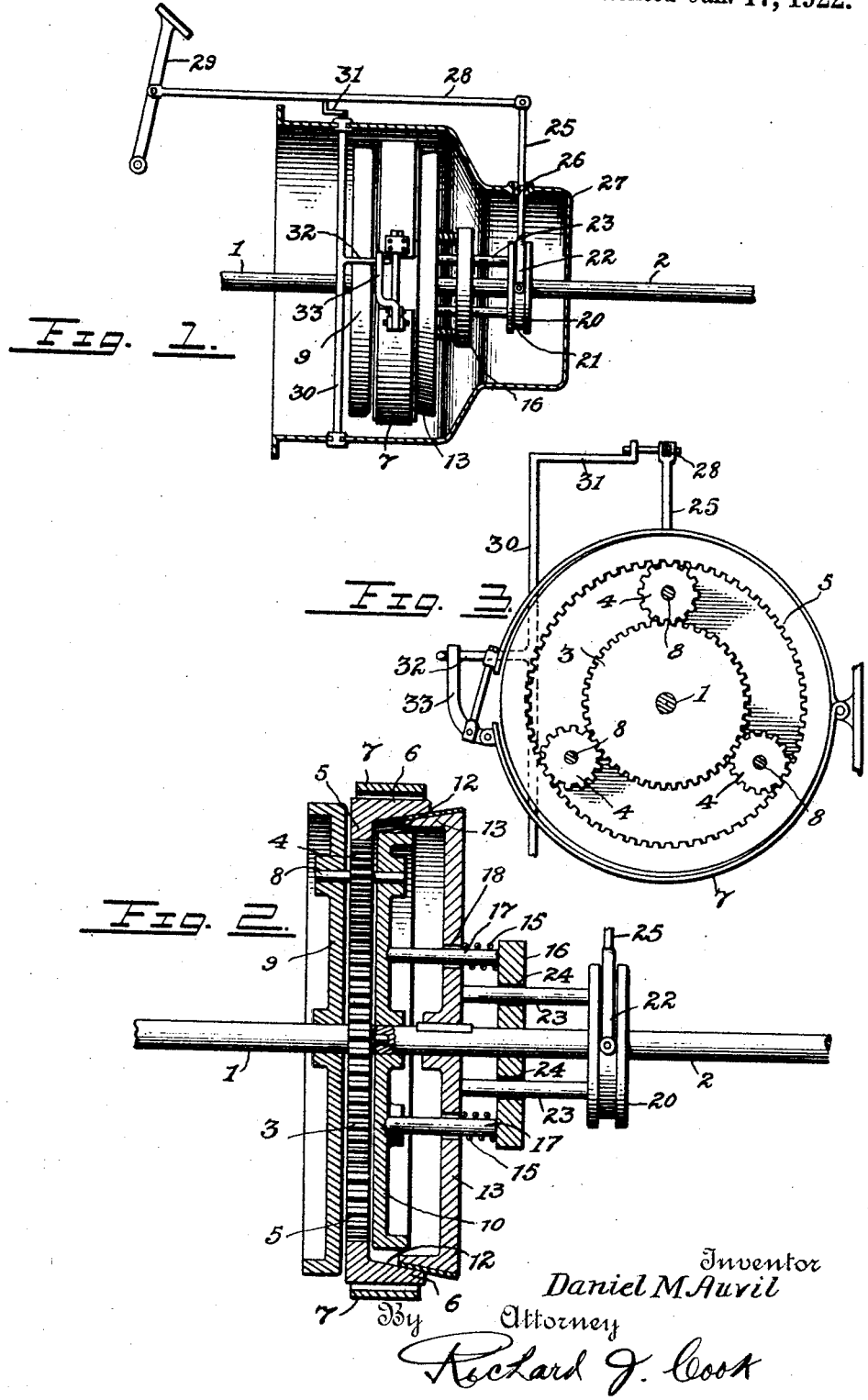

DANIEL M. AUVIL, OF ELBE, WASHINGTON.

SPEED-CHANGING MECHANISM.

1,404,081.   Specification of Letters Patent.   Patented Jan. 17, 1922.

Application filed June 22, 1920. Serial No. 390,758.

*To all whom it may concern:*

Be it known that I, DANIEL M. AUVIL, a citizen of the United States, and resident of Elbe, county of Pierce and State of Washington, have invented certain new and useful Improvements in Speed-Changing Mechanism, of which the following is a specification.

My invention relates to speed changing mechanism, and more particularly to mechanism of that character adapted for use in connection with the drive shaft of an automobile or other motor vehicle and wherein a planetary gear system is used in connection with shiftable clutch mechanism in a manner whereby a change in speed of the driven shaft may be secured by shifting certain parts of the mechanism to permit or prevent movement of the planetary system.

The object of the invention is to combine a planetary gear system with clutch and brake mechanism in a construction that will be simple and efficient and whereby a change of speed and power may be transmitted to a driven shaft, and to adapt the mechanism for use in automobiles or the like.

In accomplishing this and other objects of the invention, I have provided the improved details of structure, the preferred forms of which are illustrated in the accompanying drawings, wherein—

Figure 1 is a side elevation of a speed changing mechanism constructed according to the present invention.

Figure 2 is a longitudinal section of the same.

Figure 3 is a sectional view on the line 3—3 of Figure 2.

Referring more in detail to the drawings—

1 and 2 designate alined, independently rotatable sections of a driving shaft such as would be used in driving an automobile; the section 1 being an extension of the engines crank shaft while the section 2 extends to the differential driving mechanism.

Keyed onto the shaft section 1 is a gear wheel 3, which is the central gear of a planetary system. This gear meshes with the three equally spaced apart pinions 4 which are the intermediate gears of the system and which in turn travel in mesh with an internally geared ring 5 provided with a peripheral flange 6 about which a brake band 7 is located and adapted to be tightened to prevent rotation of the ring gear.

The pinions 4 are revoluble on supporting shafts 8 that are fixed in disks 9 and 10 at opposite sides of the gear wheel 3; the disk 9 being revoluble on the shaft 1 while the disk 10 is keyed or fixed to the shaft section 2.

The peripheral flange 6 of the gear ring 5 has an internal conically tapered clutch seat 12 against which a clutch disk 13, that is slidably keyed to the shaft section 2, may be moved to lock the ring gear against rotation relative to the shaft 2, or which may be shifted outwardly so as to permit the ring gear to revolve freely when the brake band 7 is loosened.

This clutch is yieldingly urged to locked relation with the ring gear by means of two or more coiled springs 15 which bear at their opposite ends against the outer face of the clutch disk and against a plate 16 that is held rigidly at a certain spaced distance from the disk 10 by means of posts 17 fixed at their opposite ends to the said disk 10 and plate 16, and which extend through openings 18 in the clutch disk. These posts also serve as means for mounting and holding the springs 15 in functional position.

Means for shifting the clutch from the ring gear consists of a collar 20 that is slidable and revoluble on the shaft 2 and which has an annular channel 21 therein wherein the ends of a shifting yoke 22 are extended; the collar being attached to the clutch disk by rods 23, which extend slidably through openings 24 in the plate 16.

The yoke 22 is formed at the lower end of a shifting lever 25 that is pivotally mounted, as at 26, to a casing member 27, and at its upper end is connected to a rod 28 which extends to a foot lever 29 which, when moved forwardly, will actuate the clutch from locked relation with the ring gear.

In connection with the clutch shifting mechanism, I have also provided means for actuating the brake band against or from the ring gear. This mechanism consists of a rod 30 that is mounted vertically and revolubly within the housing enclosing the mechanism and which, at its upper end, has a crank arm 31 fixed thereon and so connected with the rod 28, that shifting of the latter will cause the rod 30 to be partially revolved. On this rod 30 is a laterally extending arm 32 which has its outer end disposed back of the outer end of a lever 33, which controls the tightening or loosening of the brake band. The construction being such that when the foot pedal is moved forwardly to move the clutch from the gear ring, the rod 30 will be rotated so as to cause the arm 32 to engage the brake lever 33 and move the latter to tighten the band, which is fixed to the casing 27, against the gear ring and hold the same against rotation. Likewise, when the clutch is shifted to locking relation with the gear ring, the brake band is loosened.

Assuming that the mechanism is so constructed and assembled, operation of the device would be as follows: Assuming that the brake band is loose about the ring gear and the clutch is locked therein, rotation of the shaft 1, through the gear 3 acts against the pinions 4. Since the disk 10 is keyed onto the shaft 2, and the ring gear 5 is locked to the clutch disk, which also is keyed to the shaft 2, it is apparent that the pinions cannot rotate and, consequently, the ring gear is rotated at the same speed of the shaft 1 and, through the clutch disk, rotates the shaft 2 at the same speed.

If, however, the foot pedal is actuated to move the clutch outwardly to release the same from the ring gear, the two shaft sections, 1 and 2, may rotate at different speeds. The parts are so arranged that the initial movement of the foot pedal releases the clutch and a further movement actuates the brake band against the ring gear.

With the clutch free, and the ring gear locked by the brake band against rotation, it is apparent that, as the shaft 1 is driven, the gear 3 causes the pinions to follow around the ring gear in the same direction, but at a lower speed, and these being mounted on the disk 10, rotate the latter and the shaft section 2 at a reduced speed.

It is apparent that with the parts constructed and assembled as described, an efficient and reliable means is provided for obtaining another speed ratio.

What I claim as new, is:

The combination with a casing and alined independently rotatable shaft sections mounted within said casing, of a planetary gear system having its central gear fixedly mounted on the primary shaft, a disk rotatably mounted on the primary shaft adjacent to said central gear, a disk keyed on the secondary shaft adjacent the opposite side of said central gear, stub shafts extending between said disks, gear pinions revolubly mounted on said shafts in mesh with the central gear, an external ring gear mounted to travel enmesh with said pinions and provided with a laterally extending clutch flange, a clutch disk keyed to the secondary shaft and movable from and against said ring gear flange, a brake band fixed to the casing to enclose the ring gear, a shifting lever for the clutch disk, yieldable means normally urging said clutch to clutching relation with the ring gear, and lever mechanism operable to simultaneously move said clutch to non-functional position and to tighten the brake band about the ring gear, for the purpose set forth.

Signed at Elbe, Washington, this 14th day of June, 1920.

DANIEL M. AUVIL.